United States Patent
Vedder

(10) Patent No.: US 8,186,759 B2
(45) Date of Patent: May 29, 2012

(54) LOCKING DEVICE FOR A VEHICLE SEAT

(75) Inventor: Andreas Vedder, Haan (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 390 days.

(21) Appl. No.: 12/446,634

(22) PCT Filed: Jan. 23, 2008

(86) PCT No.: PCT/EP2008/000477
§ 371 (c)(1),
(2), (4) Date: Apr. 22, 2009

(87) PCT Pub. No.: WO2008/095602
PCT Pub. Date: Aug. 14, 2008

(65) Prior Publication Data
US 2010/0060070 A1    Mar. 11, 2010

(30) Foreign Application Priority Data

Feb. 6, 2007   (DE) .......................... 10 2007 006 603

(51) Int. Cl.
*B60N 2/42*  (2006.01)
(52) U.S. Cl. ................................. 297/378.11; 297/367 R
(58) Field of Classification Search ............. 297/378.11, 297/216.1, 367 R
See application file for complete search history.

(56) References Cited

U.S. PATENT DOCUMENTS

| | | | | |
|---|---|---|---|---|
| 5,058,240 A | * | 10/1991 | Barda et al. | 297/378.11 |
| 6,598,938 B2 | * | 7/2003 | Boltze et al. | 297/378.11 X |
| 6,742,845 B2 | * | 6/2004 | Nock | 297/378.11 |
| 7,000,992 B2 | * | 2/2006 | Armbrust et al. | 297/378.11 |
| 2006/0055219 A1 | * | 3/2006 | Heimann et al. | 297/276 X |

FOREIGN PATENT DOCUMENTS

| | | |
|---|---|---|
| DE | 101 21 352 | 11/2002 |
| DE | 10 2004 051873 | 4/2006 |
| WO | WO 01/76907 | 10/2001 |

* cited by examiner

*Primary Examiner* — Anthony D Barfield
(74) *Attorney, Agent, or Firm* — McGlew and Tuttle, P.C.

(57) ABSTRACT

A locking device (1), particularly for a vehicle seat, for the detachable locking of two components (5, 8) that can be displaced relative to each other, includes a first locking element (11) that is supported on the first component (5) in a displaceable, particularly a pivoting manner about a first bearing pin (13) and a second locking element (12) that is associated with the second component (8) and that interacts with the first locking element (11) in a locked state of the locking device (1). A first safety element (15), that can be displaced relative to the first locking element (11), secures the locked state of the locking device in the normal case by acting on the first locking element (11). A second safety element (17) is provided that can be displaced relative to the first locking element (11). The safety element supports the first locking element (11) at least in the case of a crash. At least one spring (25) applies a force (K) to at least one of the two safety elements (15, 17), which is supported on a second bearing pin (19) pivotally about the center (Z) thereof, at a point (P) and pretensions the element against the first locking element (11) or against a stop (23). The force (K) travels through the center (Z) in at least an angular position of the safety element (15, 17) acted on by the spring (25).

17 Claims, 2 Drawing Sheets

LOCKING DEVICE FOR A VEHICLE SEAT

CROSS REFERENCE TO RELATED APPLICATIONS

This application is a United States National Phase application of International Application PCT/EP2008/000477 and claims the benefit of priority under 35 U.S.C. §119 of German Patent Application DE 10 2007 006 603.3 filed Feb. 6, 2007, the entire contents of which are incorporated herein by reference.

FIELD OF THE INVENTION

The invention relates to a locking device, in particular for a vehicle seat, for releasably locking two components which may be moved relative to one another, including a first locking element which is movably mounted on the first component, a second locking element which is associated with the second component, and which in a locked state of the locking device interacts with the first locking element, at least one safety element which is movable relative to the first locking element, which secures the locked state of the locking device, and at least one spring which pretensions the safety element against the first locking element or against a stop.

BACKGROUND OF THE INVENTION

In a known locking device of this type, for the transition into the unlocked state, the safety elements are pivoted away from the first locking element and held open. At the same time, a correspondingly large counter-torque may be applied to the safety elements relative to the closing torque which is present by the superimposition of spring pretensioning.

SUMMARY OF THE INVENTION

The object of the invention is to improve further a locking device of the aforementioned type.

This object is achieved according to the invention by a locking device for releasably locking two components which may be moved relative to one another. The locking device comprises a first locking element which is movably mounted on the first component, in particular pivotably about a first bearing pin. A second locking element is associated with the second component and, in a locked state of the locking device, interacts with the first locking element. A safety element is movable relative to the first locking element and secures the locked state of the locking device. The safety element is pivotably mounted on a second bearing pin about a center thereof. A spring acts upon the safety element at a point with a force to pretension the safety element against the first locking element or against a stop with the force of the spring having a force line of application which approaches the center with angular position changes of the safety element in an opening direction of movement of the safety element.

When opening the safety element acted upon by the spring, as the line of application of the force approaches the center, depending on the angular position of the safety element, the torque exerted by the spring on the safety element is reduced, so that said torque has to be overcome by a reduced actuating torque. Preferably, in at least one angular position of the safety element acted upon by the spring, the line of application of the force travels through the center, so that then the spring in this angular position does not exert any torque on the safety element. Insofar as the safety element has to be held open in the unlocked state of the locking device, the interaction between the spring and the safety element, for example by using a control contour, may be adjusted such that the safety element which is held open adopts precisely this angular position, i.e. the entire counter-torque, which is defined by superimposing the different pretensioning and which is to be applied for holding open the safety element, is at a minimum.

The invention is explained in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
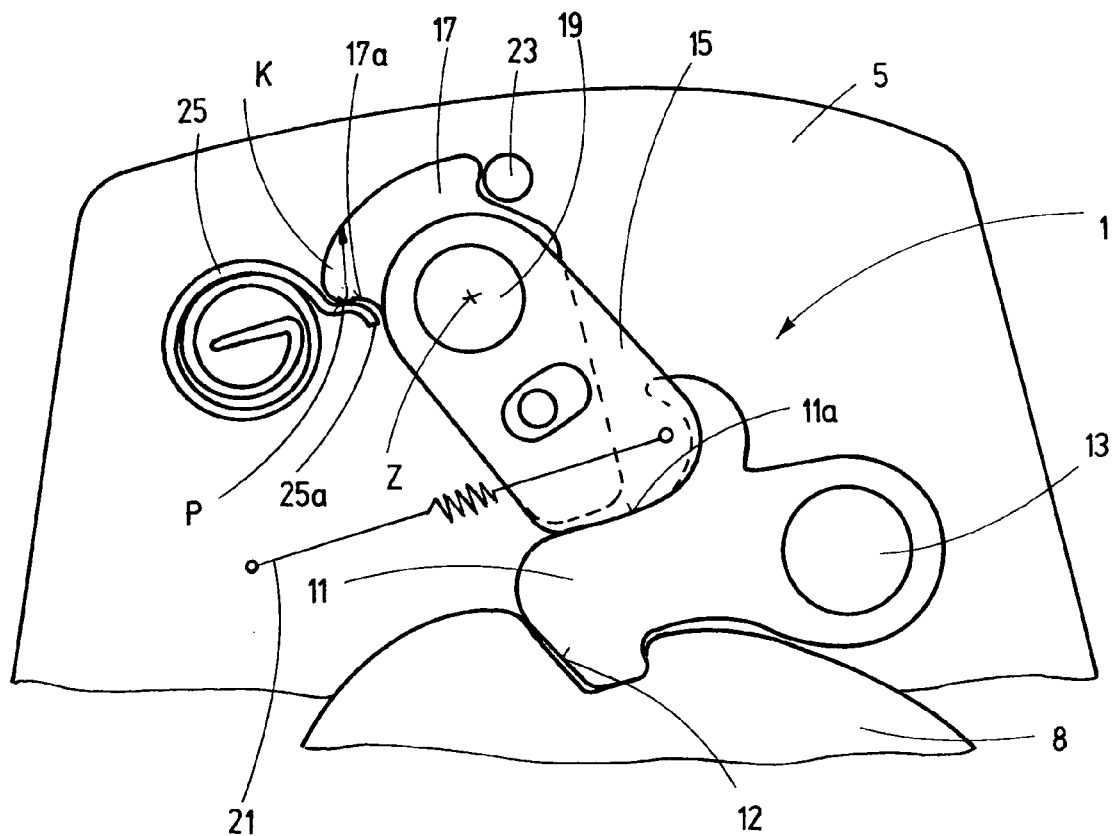
FIG. 1 is a view of the exemplary embodiment according to the invention, shown in the locked state.
Figure 2:
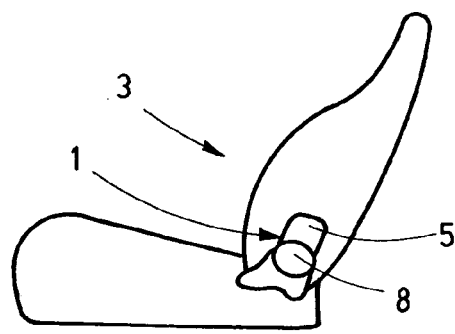
FIG. 2 is a schematic side view of a vehicle seat with locking device according to the invention.
Figure 3:
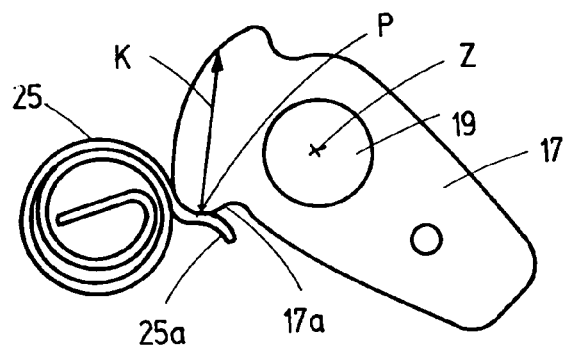
FIG. 3 is a partial view of the exemplary embodiment in a first intermediate position.
Figure 4:
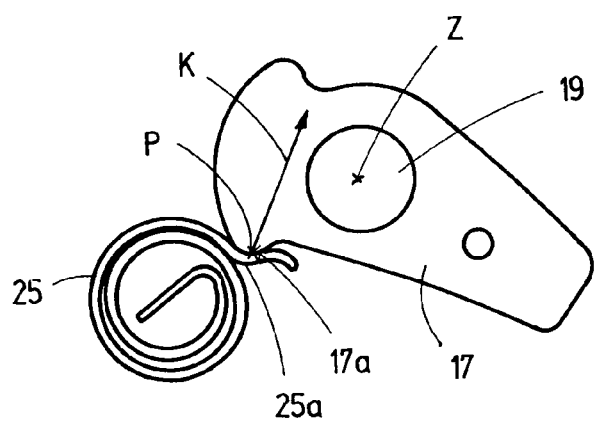
FIG. 4 is a partial view of the exemplary embodiment in a second intermediate position.
Figure 5:
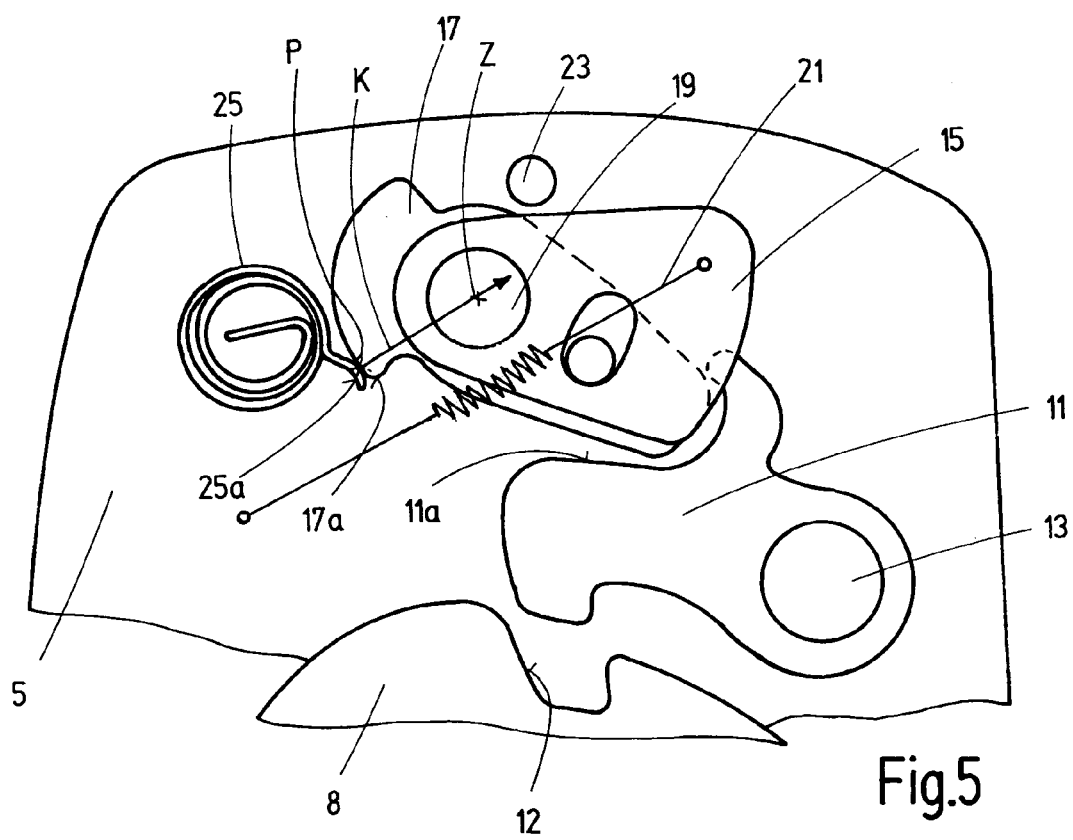
FIG. 5 is a view of the exemplary embodiment in the unlocked state.

Referring to the drawings in particular, a locking device 1 of a vehicle seat 3 of a motor vehicle is provided for releasably locking a first component 5 to a second component 8, and namely in a manner which is secure in the event of a crash. The two components 5 and 8 may, for example, be fitting parts of a catch fitting, such as is disclosed, for example, in EP 1 187 738 B1, or a gear-operated fitting with a freely pivoting function, as is disclosed, for example, in EP 1 334 867 B1. For the present exemplary embodiment, the last-mentioned variant is selected. The first component 5 may, however, also be a lock such as is disclosed, for example, in EP 1 373 011 B1, and the second component 8 may be the associated counter element, such a lock being used, for example, for locking the backrest or the mounting feet of the vehicle seat to the vehicle structure. The disclosure relative thereto is expressly included.

The locking device 1 comprises a first locking element 11 which is movably, preferably pivotably, mounted on the first component 5, and a second locking element 12 which is provided on the second component 8, in particular formed on or attached to the second component, or forms the second component 8. The two components 5 and 8 are locked together, i.e. the locking device 1 is in a locked state when the two locking elements 11 and 12 interact. For the present exemplary embodiment the first locking element 11 is a pawl which is pivotably mounted on a first bearing pin 13, which is fixedly connected to the first component 5, and which bears a toothing, whilst the second locking element 12 is a counter-toothing formed on the second component 8. The first locking element 11 has a bearing surface 11a on the side remote from the second locking element 12.

The locking device 1 further comprises a first safety element 15 and a second safety element 17. Both safety elements 15 and 17 are pivotably mounted on a second bearing pin 19 of the first component 5 parallel to the first bearing pin 13, in particular on the same second bearing pin 19. The center of the second bearing pin 19 is denoted by Z. The second bearing pin 19 may be configured as a shaft, on which one of the two safety elements 15 or 17 is located fixedly in terms of rotation. Both safety elements 15 and 17 are pretensioned toward the first locking element 11, said first locking element being located with its bearing surface 11a in the pivoting region of the safety elements 15 and 17 when it interacts with the second locking element 12, in particular being in engagement or at least nestled together.

The first safety element 15 serves as a tensioning element and is pretensioned by a tension spring 21—in the present case configured as a traction spring. The first safety element 15 which is spring-loaded in this manner, secures the locked state of the locking device 1 in the normal case, by the first safety element 15 acting upon the first locking element 11 on the bearing surface 11a, and pretensioning the first locking element against the second locking element 12. In this connection, the first safety element 15—in the present case configured as an eccentric—bears without clearance at an angle outside the self-locking region against the bearing surface 11a. If very large forces act between the components 5 and 8, for example in the event of a crash, the first locking element 11 exerts an opening torque from the first safety element 15, so that said first safety element is pivoted back counter to its pretensioning. The first locking element 11 may, as a result, move in its opening direction.

The second safety element 17 serves as a catch element, which in the normal case is arranged at a short distance, i.e. a distance which is short relative to the height of the teeth of the locking elements 11 and 12, and in the present case bears against a stop 23. The second safety element 17 in the event of a crash supports the first locking element 11 pivoting in its opening direction after a short pivoting path, by bearing at an angle within the self-locking region, in particular without exerting an opening torque, against the bearing surface 11a or a different surface of the first locking element 11. The second safety element 17 may in the supported region, for example, be curved in a concentric manner about the second bearing pin 19 or extend tangentially thereto. In the present case, the second safety element 17 is pretensioned by a spring 25. The spring 25 is, in the present case, configured as a flat spiral spring.

In order to unlock the locking device 1, i.e. to bring the unlocking device into the unlocked state, initially one of the two safety elements 15 or 17 is pivoted away from the first locking element 11 i.e. opened and held open, by means of the bearing pin 19 configured as a shaft, or a cable pull attached to the safety element 15 or 17. Preferably, the two safety elements 15 and 17 are coupled to one another so that they may be carried along with a delay in terms of travel, for example by a slot-pin-guide, so that after a defined idling path the other of the two safety elements 15 and 17 which is initially unmoved, is carried along. The first locking element 11 is as a result released, preferably the opening second safety element 17 pulling up the first locking element 11, for example by means of a finger or the like. Thus the first locking element 11 is moved away from the second locking element 12. As soon as the two locking elements 11 and 12 have moved away from one another to such an extent that they no longer interact, the locking device 1 is unlocked. The two components 5 and 8 may now be moved relative to one another. If the initially pivoted-away safety element 15 or 17 is released, the pretensioning ensures that the first locking element 11 is again acted upon by the first safety element 15 and is brought into engagement with the second locking element 12.

The torque which is required for holding open the pretensioned safety elements 15 and 17, is determined by the characteristic curves of the pretensioning of the safety elements 15 and 17, in the present case therefore the tension spring 21 and the spring 25. The spring 25 interacts with a control contour 17a of the second safety element 17, in the present case a spring arm 25a bearing against the control contour 17a at the radial external end of the spring 25 at a point P, which is able to alter its location, and being able to slide along said control contour. In the locked state, the tension spring 21 acts with a relatively small force and a relatively large effective lever arm at the center Z on the first safety element 15. The spring 25 holds the second safety element 17 with a small force and at a large effective distance from the center Z.

During opening, the first safety element 15 is pivoted away and thus tensions the tension spring 21. As a result of the tensioning, the force of the tension spring 21 increases and at the same time the effective lever arm is reduced. In the case of the second safety element 17, initially a large unlocking torque has to be overcome counter to the spring 25. During the further opening process, this required unlocking torque is reduced due to the shape of the control contour 17a selected according to the invention, in the present case a portion curved in a concentric manner relative to the second bearing pin 19. The line of application of the force K of the spring 25 acting upon the second safety element 17 at the current point P, more specifically the straight line along the line of application of the force K, approaches the center Z of the second bearing pin 19, i.e. the axis of rotation of the second safety element 17, depending on the angular position of the second safety element 17.

Thus the characteristic curve of the torque, which is exerted about the second bearing pin 19 by the force of the spring 25 on the second safety element 17, referred to more concisely as the torque characteristic curve, approaches a zero point, depending on the angular position of the second safety element 17. This zero point is reached with a specific angular position of the second safety element 17, in the present case at the end of the opening process. The spring 25, therefore, does not exert any torque on the second safety element 17. Instead, the force K travels directly through the center Z. Only a pure bearing force is thus applied to the second safety element 17. As a result, the entire counter torque which is required for holding both safety elements 15 and 17 open, reaches a minimum level.

By the appropriate choice of control contour 17a, the torque characteristic curve, i.e. the characteristic curve of the torque, which is exerted about the second bearing pin 19 by the force of the spring 25 on the second safety element 17, may be influenced such that the force for unlocking the locking device 1 corresponds to an actuating force path which is perceived as pleasant by the user. For example, the actuating force path may initially be slightly raised, may then decrease and finally moderately rise.

During locking (closing), the tension spring 21 initially pulls the first safety element 15 in the closing direction. The first safety element 15 carries along the second safety element 17 via the slot-pin-guide. If the second safety element 17 approaches the stop 23, due to its control cam 17a and the spring 25, it is moved into its locked position, i.e. brought to bear against the stop 23. At the same time, the first safety element 15 presses the first locking element 11 into its locked position and sets the system without clearance.

While a specific embodiment of the invention has been shown and described in detail to illustrate the application of the principles of the invention, it will be understood that the invention may be embodied otherwise without departing from such principles.

LIST OF REFERENCE NUMERALS

1 Locking Device
3 Vehicle seat
5 First component
8 Second component
11 First locking element
11a Bearing surface
12 Second locking element
13 First bearing pin
15 First safety element
17 Second safety element
17a Control contour
19 Second bearing pin
21 Tension spring
23 Stop
25 Spring
25a Spring arm
K Force
P Point
Z Center

The invention claimed is:

1. A locking device for a vehicle seat, for releasably locking two components which may be moved relative to one another, the locking device comprising:
a first locking element movably mounted on the first component for pivoting about a first bearing pin;
a second locking element associated with the second component and, in a locked state of the locking device, interacting with the first locking element, said second locking element engaging said first locking element in said locked state, at least a portion of said first locking element being located at a spaced location from said second locking element in an unlocked state;
a safety including at least one safety element pivotably mounted on a second bearing pin for movement about a center of said second bearing pin relative to the first locking element, said safety securing the locked state of the locking device;
at least one spring acting upon the safety element, at a point with a force pretensioning the safety element against the first locking element or against a stop with a line of application of the force moving and approaching the center with an opening direction of movement of the safety element in the unlocked state, with a distance of the line to the center depending on the angular position of the safety element, said safety element comprising a control contour portion, said at least one spring comprising a spring arm, said control contour portion moving along said spring arm with said at least one safety element moving from one position to another position in an opening direction of movement in the unlocked state of the locking device, said spring arm being at a first distance from said center of said second bearing pin with said at least one safety element in said one position, said spring arm being located at a second distance from said center of said second bearing pin with said at least one safety element in said another position, said second distance being greater than said first distance, said at least one spring exerting a first torque on said at least one safety element with said at least one safety element in said one position, said at least one spring exerting a second torque on said at least one safety element with said safety element in said another position, said first torque being greater than said second torque.

2. The locking device as claimed in claim 1, wherein in at least one angular position of the safety element acted upon by the spring, the line of application of the force travels through the center.

3. The locking device as claimed in claim 1, wherein the safety further comprises another safety element such that at least two safety elements are provided, of which a first safety element secures the locked state of the locking device in the normal case by acting upon the first locking element.

4. The locking device as claimed in claim 3, wherein the first safety element serves as a tensioning element which in the normal case acts upon the first locking element and pretensions the first locking element against the second locking element.

5. The locking device as claimed in claim 4, further comprising a tension spring pretensioning the first safety element.

6. The locking device as claimed in claim 3, wherein a second safety element is movable relative to the first locking element and at least in the event of a crash supports the first locking element.

7. The locking device as claimed in claim 6, wherein the second safety element comprises a catch element, which in the normal case is arranged at a short distance from the first locking element and in the event of a crash supports the first locking element pivoting in its opening direction.

8. The locking device as claimed in claim 3, wherein in the unlocked state of the locking device the safety elements are held open.

9. The locking device as claimed in claim 1, wherein the spring is configured as a flat spiral spring.

10. The locking device as claimed in claim 1, wherein the safety element acted upon by the spring has a control contour against which the spring bears at the point by means of a spring arm.

11. The locking device as claimed in claim 10, wherein with a pivoting motion of the safety element acted upon by the spring, the spring slides along the control contour with the spring arm.

12. The locking device as claimed in claim 10, wherein the control contour has at least one portion which is curved in a concentric manner relative to the center.

13. The locking device as claimed in claim 12, wherein the spring acts upon the safety element with the force traveling through the center, when the spring arm bears at the point against the portion of the control contour which is curved in a concentric manner relative to the center.

14. The locking device as claimed in claim 1, wherein the angular position of the safety element acted upon by the spring, is achieved by the force traveling through the center when unlocking the locking device.

15. The locking device as claimed in claim 1, wherein for unlocking the locking device initially the safety elements are pivoted away from the first locking element, and then the two locking elements move away from one another to such an extent that the two locking elements no longer interact in said unlocked state.

16. A vehicle seat, comprising:
a vehicle seat structure comprising a locking device, said locking device comprising:
a first locking element movably mounted on the first component for pivoting about a first bearing pin;
a second locking element associated with the second component and, in a locked state of the locking device, interacting with the first locking element, said second locking element engaging said first locking element in said locked state, at least a portion of said first locking element being located at a spaced location from said second locking element in an unlocked state;

a safety including at least one safety element pivotably mounted on a second bearing pin for movement about a center of said second bearing pin relative to the first locking element, said safety securing the locked state of the locking device;

at least one spring acting upon the at least one safety element with a force approaching the center with the locking device in the unlocked state, said at least one safety element comprising a control contour portion, said at least one spring comprising a spring arm, said control contour portion moving along said spring arm with said at least one safety element moving from one position to another position in an opening direction of movement in the unlocked state of the locking device, said spring arm being at a first distance from said center of said second bearing pin with said at least one safety element in said one position, said spring arm being located at a second distance from said center of said second bearing pin with said at least one safety element in said another position, said second distance being greater than said first distance, said at least one spring exerting a first torque on said at least one safety element with said at least one safety element in said one position, said at least one spring exerting a second torque on said at least one safety element with said safety element in said another position, said first torque being greater than said second torque.

17. A locking device for a vehicle seat, for releasably locking two components which may be moved relative to one another, the locking device comprising:

a first bearing pin;

a first locking element movably mounted on the first component via said first bearing pin such that said first locking element is movable about said first bearing pin between a locked state and an unlocked state;

a second locking element associated with the second component, said second component engaging said first locking element with said first locking element in said locked state, at least a portion of said first locking element being located at a spaced location from said second locking element with said first locking element in said unlocked state;

a second bearing pin;

a safety including at least one safety element pivotably mounted on said second bearing pin such that said at least one safety element is movable, about a center of said second bearing pin relative to the first locking element, from a first safety element position to a second safety element position, said safety securing said first locking element with said first locking element in said locked state;

a spring in contact with said at least one safety element with said first locking element in said locked state and said unlocked state, said spring exerting a spring force on said at least one safety element, said at least one safety element compressing said spring as said at least one safety element moves from said first safety element position to said second safety element position such that said spring force approaches said center of said second bearing pin, said at least one safety element comprising a control contour portion, said spring comprising a spring arm, said control contour portion moving along said spring arm with said at least one safety element moving from said first safety element position to said second safety element position in a safety element opening direction of movement, said spring arm being at a first distance from said center of said second bearing pin with said at least one safety element in said one position, said spring arm being located at a second distance from said center of said second bearing pin with said at least one safety element in said another position, said second distance being greater than said first distance, said spring exerting a first torque on said at least one safety element with said at least one safety element in said first safety element position, said at least one spring exerting a second torque on said at least one safety element with said at least one safety element in said second safety position, said first torque being greater than said second torque, said force passing through said center of said second bearing pin with said at least one safety element in said second safety element position, said spring being in a substantially uncompressed state with said at least one safety element in said first safety element position, said control contour portion being in contact with an end portion of said spring arm with said at least one safety element in said second safety element position, said control portion being in contact with a portion of said spring arm with said at least one safety element in said first safety element position, said portion of said spring arm being located at a spaced location from said end portion of said spring arm, said spring being arranged on one side of said at least one safety element.

* * * * *